May 4, 1965   J. MAKSIM, JR   3,181,811

CIRCULAR AIRFOIL AERODYNAMIC LIFT MECHANISM

Filed Jan. 27, 1964   3 Sheets-Sheet 1

May 4, 1965 J. MAKSIM, JR 3,181,811
CIRCULAR AIRFOIL AERODYNAMIC LIFT MECHANISM
Filed Jan. 27, 1964 3 Sheets-Sheet 2

INVENTOR.
JOHN MAKSIM, JR.
BY
Christie, Parker & Hale
ATTORNEYS.

May 4, 1965 J. MAKSIM, JR 3,181,811
CIRCULAR AIRFOIL AERODYNAMIC LIFT MECHANISM
Filed Jan. 27, 1964 3 Sheets-Sheet 3
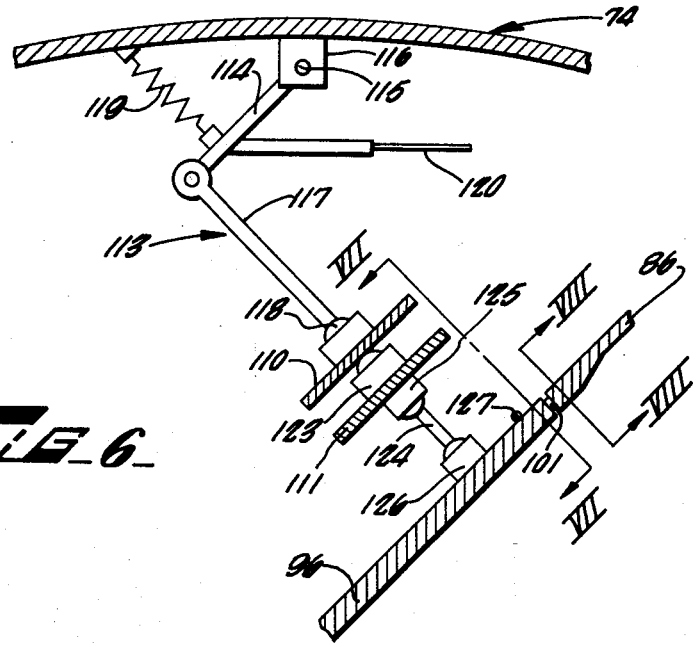
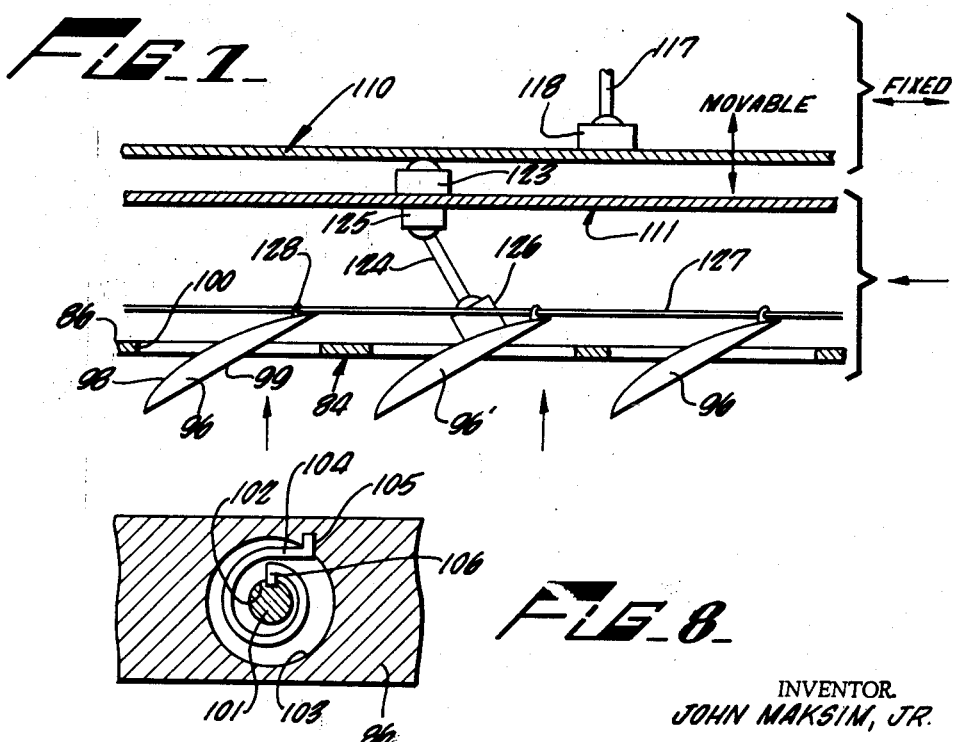
INVENTOR.
JOHN MAKSIM, JR.
BY
Christie, Parker & Hale
ATTORNEYS.

3,181,811
CIRCULAR AIRFOIL AERODYNAMIC LIFT
MECHANISM
John Maksim, Jr., 8165 Cornwall Ave., Etiwanda, Calif.
Filed Jan. 27, 1964, Ser. No. 341,837
14 Claims. (Cl. 244—12)

This invention relates to heavier-than-air craft and to aerodynamic lift mechanisms for such craft. More particularly, the invention relates to heavier-than-air craft in which lift is produced by a forced draft of air over circular airfoils which are stationary with respect to the craft.

This application is a continuation-in-part of my co-pending application Serial No. 270,575, filed April 4, 1963, now abandoned.

In simplified terms, Bernoulli's theorem of fluid dynamics states that in a body of fluid, where the velocity of the fluid is greatest, the pressure of the fluid is least. This principle has been relied upon to provide lift in conventionally winged aircraft wherein lift is created by the movement of air over the curved upper surface of an airfoil at a greater velocity than the movement of air past the lower surfaces of the airfoil. An upwardly acting pressure differential is thus created across the airfoil. When the pressure differential is integrated over the area of the airfoil and exceeds the weight of the aircraft, the aircraft rises. Conventional aircraft rely upon horizontal movement of the aircraft over ground or water to generate the proper pressure differentials poducing lift. Since the generation of these pressure differentials is related to the velocity of the airfoils through the air, the craft must attain considerable speed before sufficient lift is developed. A major problem associated with modern winged aircraft is the length of runway required for the plane to attain the take-off velocity associated with the particular airfoil configuration of the plane.

In recent years much effort has been devoted to the perfection of aircraft which lift from the ground without requiring the use of runways. Helicopters have this property, but in helicopters the lift is entirely in the rotor blades and the payload capacity of the craft is restricted. Ducted fan craft have been developed which rely upon the thrust of a forced draft airstream to raise the craft from the ground. Alternatively, reaction motors such as jet engines or rockets may be used. In such devices, however, the ratio of required horsepower to cargo capacity is so high that such craft are economically feasible only in military applications where competitive economics are not a factor to be considered.

The present invention provides a heavier-than-air craft which relies upon a forced draft flow of air over airfoils secured to the craft to produce lift approaching the amount of lift required to overcome the weight of the craft. Movable airfoils are provided which operate in an airstream induced by the forced draft lift mechanism. Since the movable airfoils function in an airstream which is created by other means, the movable airfoils need not move at high absolute velocities to provide sufficient lift, supplemental to the lift provided by the stationary airfoils, to overcome the weight of the craft. Both lift and thrust are relied upon in the present invention. The result is a heavier-than-air craft which may rise vertically, which may be operated laterally in the air at speed attainable by helicopters, and which does not require an inordinately large engine to power the craft. The craft of the present invention has particular utility as a personnel carrier, such as a one or two passenger commutors' vehicle.

Generally speaking, this invention provides an aerodynamic lift apparatus which includes a plurality of annular coaxially aligned baffle means. The baffle means are spaced apart from each other along an axis and decrease in diameter along the axis from a first to a last baffle means. An annular wing of diameter substantially greater than the diameter of the first baffle means is disposed concentric to the axis adjacent the first baffle means. The apparatus also includes means for moving air radially through the baffle means to generate lift across the baffle means. The plurality of baffle means acts as a wing and the annular wing of the apparatus increases the effective aspect ratio of the plurality of baffle means.

More particularly, the annular wing is apertured and the flow of air radially through the plurality of baffle means induces a flow of air along the axis and through the annular wing. Rotatable variable lift means are provided concentric to the axis opposite the annular wing from the first baffle means in the induced airflow. Also, means are provided for rotating the variable lift means about the axis in the stream of induced airflow to generate lift which supplements the lift across the baffle means. The variable lift means operates in the stream of induced airflow and provides more lift than if the variable lift means operates independently of the airflow induced by the air moving radially across the baffle means.

The aerodynamic lift apparatus is incorporated into a heavier-than-air craft provided by the present invention. The craft includes a structural frame for supporting the payload of the craft relative to the lift apparatus, and also includes means for mounting the lift apparatus to the frame for universal movement of the lift apparatus relative to the frame. The craft is steered and maneuvered by varying the alignment of the axis of the lift apparatus relative to the frame. Alternatively, the craft may be steerable and maneuverable by varying the character of the lift provided by the variable lift means.

The above mentioned and other features of the present invention are more clearly set forth in the following detailed description and explanation of the invention taken in conjunction with the accompanying drawings, wherein:

FIG. 6 is a further enlarged cross-sectional elevation view of the airfoil adjusting means shown generally in FIG. 4;

FIG. 7 is a cross-sectional elevation view of the airfoil adjusting mechanism as taken along line VII—VII of FIG. 6; and FIG. 8 is a further enlarged cross-sectional elevation view of the airfoil biasing mechanism taken along line VIII—VIII of FIG. 6.

Figure 1:
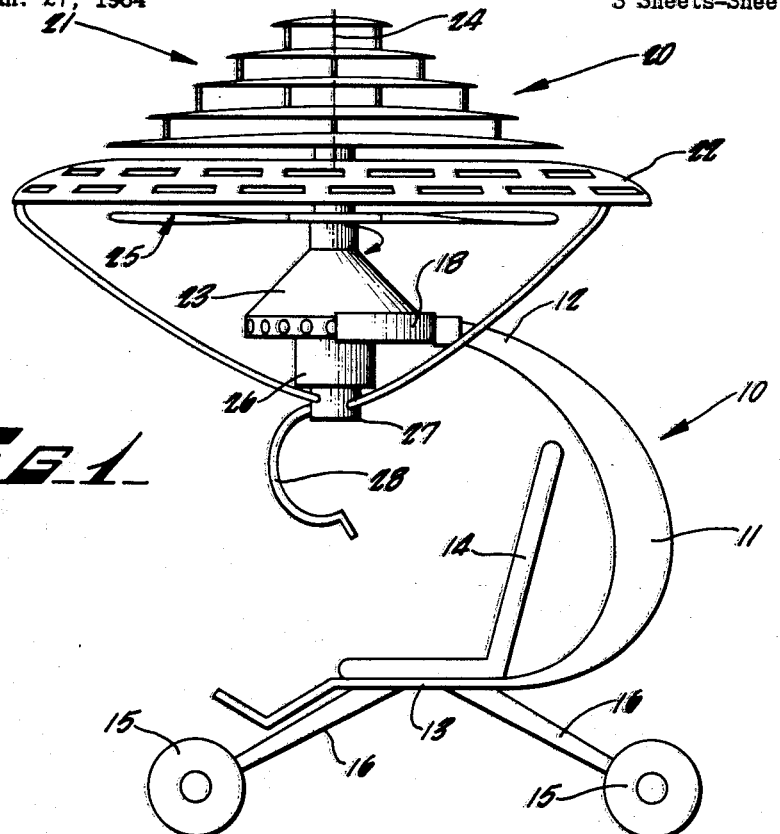
FIG. 1 is an elevation view of a heavier-than-air craft and lift mechanism therefor according to the present invention.

Referring initially to FIG. 1, a heavier-than-air craft or vehicle 10, adapted for transportation of a single passenger, is illustrated. The vehicle has a semi-circular or C-shaped frame 11 with substantially parallel upper and lower ends 12 and 13, respectively. A seat 14 for a passenger is mounted to the lower end of the frame within the vertical extent of the C-shaped frame. A plurality of tired wheels 15 are rotatably mounted to supporting struts 16 depending from the underside of the lower leg of the vehicle frame. In a preferred embodiment of the invention, the curved or arcuate portion of frame 11 is hollow and extends laterally across the back of seat 14 to provide a fuel storage compartment for the craft. A universal joint yoke mechanism 18 movably mounts a forced draft aerodynamic lift mechanism 20 to the upper end of vehicle frame 11.

In general, the lift mechanism includes a plurality of circular discs or baffle means 21, an apertured or perforated circular wing 22, and an air blower means 23, all of which are fixed relative to one another about an axis 24 along which the baffle means, the wing and the air blower means are coaxially aligned. A rotatable variable lift means 25 is disposed below the perforated wing concentric to axis 24 and is rotatably driven by a prime mover, disposed in a housing 26, which, preferably, also provides power for the air blower means. A vehicle control mechanism 27 is connected to the lower end of prime mover housing 26 and includes a control tiller 28 which depends to a position accessible by a passenger seated in seat 14. It is preferred that the center of gravity of the lift mechanism be located centrally of the universal-joint yoke.

Figure 2:
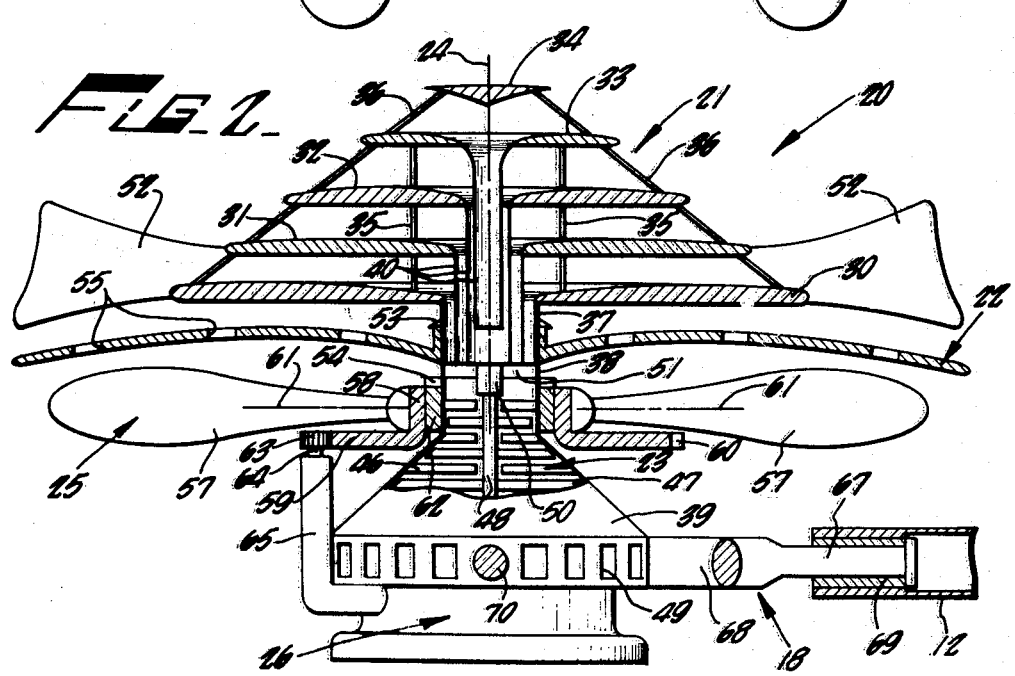
FIG. 2 is an enlarged cross-sectional elevation view of the lift mechanism illustrated in FIG. 1.
Figure 3:
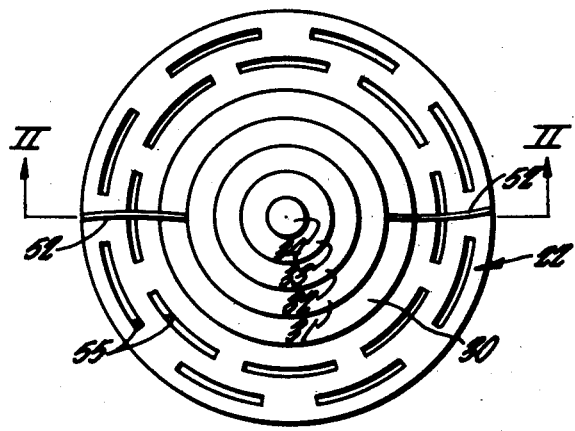
FIG. 3 is a top plan view, on a reduced scale, of the lift mechanism illustrated in FIGS. 1 and 2.
Figure 4:
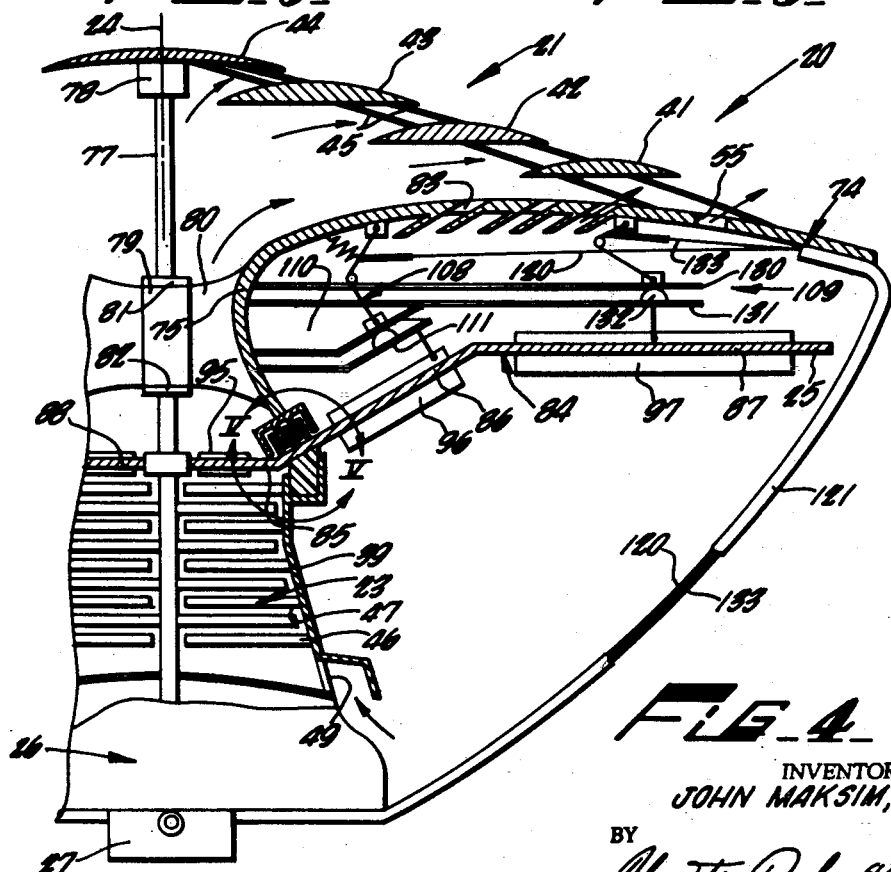
FIG. 4 is an enlarged cross-sectional elevation view of a second preferred embodiment of the lift mechanism according to the present invention.

Referring to FIGS. 2, 3 and 4, the lift mechanism baffle means is comprised of a plurality of circular annular discs 30, 31, 32, and 33, and a cap or top plate 34 disposed parallel to one another at spaced apart locations coaxially of axis 24. Each of the discs 30–33 defines an airfoil profile between its central open portion and its outer periphery. The diameters of the discs and the cap plate decrease progressing upwardly from the lower or first baffle disc 30. The baffles and the cap plate are secured relative to one another by stay members 35 and 36. The lowermost baffle 30 is secured around its central annular opening to an upper end 37 of a tubular portion 38 of a housing 39 for blower means 23. Tubular air guides 40 extend downwardly concentric to one another from respective ones of baffles 31, 32, and 33, into the tubular portion of blower means housing 39 to guide air upwardly parallel to axis 24 for discharge radially outwardly from the axis through the spaces defined between the annular airfoil discs and the cap plate. The airfoil cross-section of each of the annular discs provides aerodynamic lift on each of the discs as the air passes radially outwardly across each of the discs. Additionally, lift is provided across the combination of discs because of the difference in diameter between cap plate 34 and lower disc baffle 30. This lift across the plurality of discs is independent of the lift generated with respect to each individual baffle in that the combination of baffles acts as a single airfoil with respect to relatively stationary air above and below the combination of baffles. As the air discharged from the blower 23 is exited from the spaces between the baffles, it moves at a velocity greater than that of ambient air in the region of the lift mechanism and, accordingly, a pressure differential exists between the moving air and the ambient air. This pressure differential provides a lift force across the combination of baffles which is a function of the average pressure differential across the combination of baffles integrated over the difference in area between the lowermost baffle and the cap plate.

As illustrated in FIG. 2, the diameter of the annular opening in the lowermost circular disc corresponds to the diameter of the tubular portion of blower housing 39. The diameters of the annular openings in the succeeding circular discs become progressively smaller.

It is to be understood that it is within the scope of this invention that the flow of air through the baffles may be inwardly radially of the baffles as well as radially outwardly.

FIG. 4 illustrates an alternate form of annular airfoil discs. Discs 41, 42, and 43, have planar lower surfaces disposed perpendicular to axis 24 and have upwardly convex curved surfaces. In the case of discs 41, 42, and 43, however, the diameter of the annular opening in the lowermost baffle disc is considerably greater than the diameter of the exhaust duct from blower means 23. The diameters of the inner peripheries of the succeeding baffle discs approaching cap plate 44 become progressively smaller. No tubular air guides, such as guides 40 shown in FIG. 2, are provided in the embodiment of the invention illustrated in FIG. 4, the air discharged from the air blower means being left to seek its own discharge route through the baffle means. Discs 41 to 43 are secured relative to one another, and relative to the cap plate and circular wing 74, by rod-like stays or braces 45.

As illustrated in FIGS. 2 and 4, blower means 23 preferably is a multistage turbine compressor having a plurality of stationary guides or vanes 46 mounted to the interior of blower housing 39, and a plurality of movable vanes or blades 47 secured to a shaft 48. The movable vanes cooperate with the stationary vanes to provide successive stages of compression of ambient air drawn into housing 39 through air inlet openings 49 formed in the circumference of the lower end of the blower housing. Shaft 48 is disposed coaxially of axis 24 and extends from engine housing 26 upwardly along axis 24 to a journal bearing 50 (FIG. 2) disposed within a blower exhaust duct defined by tubular portion 38 of the blower housing. Bearing 50 is supported in spaced apart relation to the walls of the blower exhaust duct by a plurality of radial vanes 51 connected from the bearing to the blower housing. The shaft is rotatably driven by an engine disposed within engine housing 26 which is appended to the lower end of the blower housing. Preferably, the engine (not shown) is a pancake-type internal combustion engine, although it is within the scope of this invention that other types of engines may be utilized for rotation of shaft 48. It is also within the scope of this invention that blower means 23 may be some other form of compressor, such as a centrifugal blower, rather than the turbine-type multistage compressor illustrated.

A pair of vertically oriented, radially extending stabilizing vanes 52 are secured to annular airfoil baffle discs 30 and 31 (see FIG. 2) and are curved, as illustrated in FIG. 3, to develop, in combination with the air passing radially outwardly through the baffle means, a torque counter to the torque imposed upon the combination of the baffle means and the blower housing by the mechanism for rotating shaft 48. If vanes 52 were not provided, the torque associated with shaft 48 would be transferred to the blower housing and to vehicle 10 such that the vehicle would spiral slowly about axis 24.

As illustrated in FIG. 2, a circular wing 22, concave downwardly and convex upwardly, is mounted to the tubular exhaust duct portion of blower housing 39 adjacent lower airfoil baffle disc 30. Preferably the wing is axially movable relative to tubular portion 38 between stops 53 and 54 on the exterior of the tubular portion. The wing is secured from angular movement relative to the blower housing. The radial extent of the wing from axis 24 is considerably greater than the radial extent of any of the discs of baffle means 21 and provides a barrier to leakage or degradation of the pressure differential existing between the air exhausted through the baffle means and ambient air. The wing, in effect, increases the aspect ratio of disc 30 and enhances the lift characteristic provided by the combination of baffle means. The circular wing is, however, perforated or apertured, as by apertures 55, at selected locations in the area of the wing. It is preferred that the apertures be provided in the form of slots (see FIG. 3) disposed parallel to the periphery of the wing at selected locations radially of the wing.

During operation of lift mechanism 20, a pressure differential is created across the baffle means by the air flowing radially outwardly past baffle discs 30–33. Since this air also flows over the outer extremities of circular wing 22, a pressure differential is generated across the wing which induces the wing to move upwardly axially of the tubular portion of the blower housing to engage stop 53. The wing does not engage stop 53 until the maximum lift is provided across the circular wing. The wing, however, will seek a position between stops 53 and 54 which corresponds to the leakage barrier position of the wing relative to the plurality of baffle discs. Since a reduced pressure does exist across the upper convex surface of wing 22, air is induced to move upwardly through the apertures of the wing and then radially outwardly of the lift mechanism with the discharge from blower means 23. This induced movement of air through the wing provides an upwardly moving stream of air parallel to axis 24.

A rotatable variable lift means, represented generically in the drawings by character 25, is mounted below the circular perforated wing to take advantage of the vertically moving airstream flowing through the wing. One preferred embodiment of the variable lift means is illustrated in FIG. 2 and shows a propeller having a plurality of adjustable pitch blades 57 mounted to to the hub 58 of a ring gear 59 having teeth 60 around the outer periphery of the gear. Each propeller blade is adjustable about an axis 61 disposed perpendicular to axis 24 of the lift mechanism. Conventional pitch adjusting means are included with the structure of the lift mechanism provided by this invention, but since such adjusting means are conventional they are not illustrated and do not form a part of this invention. Gear 59 is mounted for rotation about blower housing 39 by a bearing sleeve 62 secured to the exterior of the tubular portion of the blower housing. The gear is rotated by a pinion 63 connected to the upper end of a rotatable shaft 64 rotatably mounted in a housing 65, extending from motor housing 26, and driven from the engine in the engine housing.

The lift associated with the baffle means 21 normally is at the threshold of being sufficient to overcome the weight of the vehicle and its load. With the lifting mechanism idling (providing lift only in association with the baffle means) propeller blades 57 are adjusted about axes 61 so that they provide no lift as they rotate in the airstream induced to flow through the circular wing. When it is desired to lift the vehicle, the pitch angle of the propeller blades is adjusted relative to the induced airstream so that lift is provided by the propeller blades. This lift, in combination with the lift associated with the baffle means, is sufficient to overcome the weight of the vehicle and its load.

The lift mechanism illustrated in FIG. 2 is mounted to the upper end of vehicle frame 11 by a yoke member of Y-shaped configuration having a stem 67 and two semicircular arms 68. The stem of the yoke is journalled in a bearing 69 fitted within the hollow extent of upper end 12 of the vehicle frame. A pair of trunnions 70 extend radially from the blower housing at diametrically spaced apart locations and are pivotally engaged within the ends of arms 68 of the universal joint yoke. The vehicle is maneuvered by varying the direction in which axis 24 of the lift mechanism extends since the lift components are along axis 24.

A particular preferred embodiment of the invention, illustrated in FIGS. 2 and 3, has been described above in order that the significance of variations therefrom in a second preferred embodiment of the invention, illustrated in FIG. 4, may become more apparent. In the embodiment of the invention illustrated in FIG. 4, a wing 74 is provided disposed substantially perpendicularly to axis 24 and extending radially outwardly from the axis beyond the outermost extent of lowermost baffle 41. Stays 45 for the baffle discs are secured to the upper surface of the wing adjacent its outer circumference. The wing is annular in character and defines a nozzle-type exhaust duct 75 for blower means 23 in that the wing is curved downwardly and outwardly of the axis to define a continuation of blower means housing 39. The wing provides a barrier to prevent leakage of ambient air into the reduced pressure zone associated with baffle means 21 and prevents degradation of the lift associated with the baffle means. Blower means 23 has a shaft 77 to which are mounted movable vanes 47 of a multistage turbine-type compressor. The shaft extends concentric to axis 24 to a journal bearing 78 secured to the underside of cap plate 44. Within the nozzle area 75, defined by the annular wing, the shaft is journalled by a sleeve 79 supported relative to the wing by a plurality of vertically disposed radially extending vanes 80. Flanges 81 and 82 are secured to shaft 77 at opposite ends of sleeve 79 and position the sleeve axially relative to the shaft in order to secure the inner portions of the wing relative to the lift mechanism. The horizontal portions of the wing have a plurality of slot-like apertures 55 disposed at preselected radial locations in the wing. Additionally, louvered apertures 83 are provided in the wing to direct air, induced to move upwardly parallel to axis 24, outwardly radially of the axis after passing through the wing.

As illustrated in FIG. 4, a variable lift means 25 is provided in this second preferred embodiment of the invention, but differs from the propeller-type variable lift means illustrated in FIG. 1. As shown in FIG. 4 the variable lift means comprises a dish-shaped circular plate 84 having a central first horizontal portion 85 perpendicular to shaft 77. An upwardly sloping conical portion 86 of the plate adjoins the outer periphery of the first horizontal portion and extends upwardly and outwardly to a second horizontal portion 87 parallel to the first horizontal portion. A boss element 88 is provided in the plate concentric to axis 24 and is secured to shaft 77 so that plate 84 rotates with the shaft. The plate passes through the enclosure defined by blower housing 39 and the nozzle portion of the wing 74 at approximately the inner extent of the conical portion of plate 84.

Figure 5:
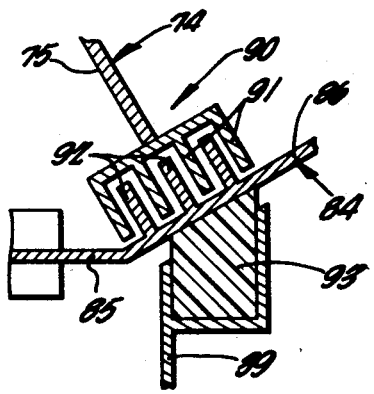
FIG. 5 is a further enlarged cross-sectional detail of the encircled portion of FIG. 4.

A labyrinth seal, illustrated in detail in FIG. 5, is provided between the lower end of nozzle portion 75 of the circular wing and the concave upwardly portion of plate 84. Labyrinth 90 includes a plurality of spaced apart parallel baffles 91 secured to circular wing 74. A cooperating plurality of spaced apart parallel baffles 92 are interengaged with baffles 91 and provide a pressure seal across the nozzle portion of wing 74 without providing mechanical contact between the relatively movable parts. A bearing 93 is secured to the upper end of the blower means housing and engages the convex downwardly side of conical portion 86 to provide mechanical support for the rotatable plate.

A plurality of fixed vanes 95 are formed in the first portion of plate 84 interiorly of blower housing 39 and are disposed radially with respect to shaft 77 of the blower means. The vanes comprise the last stage of the multistage compressor and preferably are formed by bending portions of the plate out of the plane of the plate.

Two pluralities 96 and 97 of movable vanes or blades are provided in the conical and in the second horizontal portions of plate 84, respectively. The blades are disposed radially with respect to the axis of shaft 77 and are movable into and out of the plane of the adjacent portions of the plate by means described below and illustrated in detail in FIGS. 6 and 7. Each vane, such as vanes 96 illustrated in FIG. 7, has an airfoil cross-section defined by a curved upper surface 98, and a planar lower surface 99. Each blade cooperates in a corresponding aperture 100 formed in the rotatable plate. The extent of the aperture circumferentially of the plate is substantially equal to the chord of the airfoil vane which is mounted in the aperture.

A pair of concentrically aligned trunnions 101 extend from opposite ends of each blade 96 or 97 and are engaged in cooperating cylindrical recesses 102 formed in the adjacent ends or walls of each aperture. Each recess has an enlarged diameter portion 103 opening toward the cooperating vane and receiving a coiled torsion spring 104 having one end 105 secured to the rotatable plate and the other end 106 secured to the trunnion. The spring biases the vane angularly out of alignment with the adjacent portions of the rotatable plate toward the positions illustrated in FIG. 7.

Selectively operable means are provided between the circular wing and the rotatable plate for moving the vanes in each plurality 96, 97, into and out of alignment with the adjacent portions of the plate independently of the alignment of the vanes in the other plurality of movable vanes. Blade adjustment or actuating means 108 for regulating the position of vanes 96 will be described in detail and such description generally shall serve as the description for means 109 associated with vanes 97 since vane operating means 108 and 109 are similar in many respects.

Actuating means 108 for blades 96 includes an actuator plate 110 and a follower means 111. The actuator plate (as illustrated in FIGS. 6 and 7) is a truncated portion of a right circular cone disposed concave upwardly concentric to axis 24. The actuator plate is continuous about and is spaced from the exterior surfaces of the nozzle portion of circular wing 74. The follower means is comprised of a plurality of segments of a similar right circular truncated cone disposed concave upwardly concentric to axis 24 adjacent the convex side of actuator plate 110. The actuator plate is supported to the underside of wing 74 by a plurality of pivotal link mechanisms 113 including an upper link arm 114 pivotally mounted by a pin 115 to a lug 116 depending from the underside of the circular wing. A lower link arm 117 has one end thereof pivoted to the unsupported end of link arm 114 and has its opposite end connected to the concave surface of actuator plate 110 preferably by a ball-joint mechanism 118. A plurality of such mechanisms 113 are disposed equidistantly from one another at preselected locations circumferentially of shaft 24. In a preferred embodiment of the present invention, three such link mechanisms are provided at locations 120° from each other circumferentially of shaft 24. A tension spring 119 is connected between the underside of the wing and the upper link arm intermediate of the ends of the upper link arm. An actuating cable 120 is also connected to the upper link arm intermediate its ends and extends radially outwardly of axis 24 adjacent the underside of circular wing 74. The cable is threaded through a tubular support 121 extending from the variable lift means control housing 27 to the underside of the wing adjacent the extreme periphery of the wing. When each of the cables 120 is moved equally with respect to the other cables, the actuator plate is moved downwardly from the wing parallel to axis 24 so that the axis of the cone defined by the actuator plate is maintained coaxial with axis 24 during such movement. By selective movement of cables 120, however, the alignment of the axis of actuator plate 110 may be varied relative to the axis of the lift mechanism so that the axis of the actuator plate pivots about axis 24.

Each of the follower means is engaged with the underside of the actuator plate by friction reducing means such as a ball bearing 123 (see FIG. 6) secured to the upper side of each follower plate. Such mechanism is required since the actuator plate is stationary while the follower plates are connected to the rotatable plate and move therewith. Vanes 96 in the conical portion of rotatable plate 84 are divided into groups of vanes. The number of groups corresponding to the number of plates in the follower means and each group preferably having the same number of vanes therein as each of the remaining groups. One vane of each group (see vane 96' illustrated in FIG. 7) is connected to the follower plate for that group by means of a link 124 having a ball-joint pivotal connection 125 to the underside of the follower plate and a ball-joint pivotal connection 126 to the vane at a location on the vane spaced from the axis through trunnions 101. The remaining vanes of each group are connected to vane 96' by a Venetian blind-type linkage mechanism comprising a flexible but longitudinally stiff tie rod or cable 127 secured to the trailing edges of each of the vanes in the group by clips 128. Movement of blade 96' regulates the resiliently biased movement of the remaining vanes in the group. Clips 128 are fixed to the tie rod at preselected preferably equidistant locations along the tie rod.

Vanes 96 are provided for maneuvering the vehicle to which lift mechanism 20 is attached. The bias of the vanes relative to the rotatable plate assures that follower plates 111 are urged into contact with the underside of the actuator plate. The actuator plate is normally positioned a preselected distance from the rotatable plate so that vanes 96 assume a position relative to the conical portion of the rotatable plate which results in no lift generated by the vanes. Preferably, the no-lift position of the vanes is in alignment with the adjacent portions of the rotatable plate. When lift to augment the lift associated with baffle means 21 is desired, actuator plate 110 is moved upwardly away from the rotatable plate (the axis of the actuator plate being maintained coaxial with axis 24) so that all of vanes 96 are indexed a preselected amount relative to the rotatable plate and cooperate together to produce lift effective in a direction parallel to axis 24.

When it is desired that vanes 96 be actuated to steer the vehicle, at least one cable 120 is moved more than the remaining cables so that the axis of the actuator plate is caused to pivot about axis 24 to dispose one portion of the actuator plate farther from the upper surface of the rotatable plate than a diametrically opposed location of the actuator plate. As plate 84 rotates relative to the actuator plate, vanes 96 are caused to move into a lift generating position as they pass the portion of the actuator plate spaced farthest from the rotatable plate. Accordingly, lift is generated only by a few vanes 96, but the vanes which comprise such few vanes are continuously varied. The vanes passing the second point of the actuator plate (the point of the actuator plate closest to plate 84) do not generate lift. The lateral components of the lift generated by vanes 96 do not equalize each other as occurs when the axis of the actuator plate is parallel to axis 24. Accordingly, lift mechanism 24 has a lateral component of lift imparted thereto so that the lift mechanism tends to move in the direction of this lateral component. The lateral component of lift generated by vanes 96 may lie at any radial location on a 360° arc about axis 24 since the point of maximum spacing between the actuator and the rotatable plate may be at any location circumferentially of axis 24 depending on the combination of cables 120 which are operated selectively.

Actuator means 109 for vanes 97 is similar to means 108 described above, except that means 109 is comprised of a one-piece actuator plate 130 and a one piece follower plate 131 rollably engaging the actuator through a plurality of ball bearing type contacts 132 (see FIG. 4). Vanes 97 are operated in tandem rather than variably so that each vane 97 produces the same lift that is produced by each of the remainder of vanes 97. Vanes 97 are relied upon to provide lift having a vertical component and are actuated by a plurality of cables 133 connected through tubular members 121 to control housing 127.

The lift mechanism shown in FIG. 4 is idled by rotation of plate 84 about axis 24 with vanes 96, 97 disposed at no-lift pitches. When the mechanism is idling, an amount of lift insufficient to raise vehicle 10 is generated in baffle means 21. When it is desired that the vehicle be lifted, means 109 is operated so that vanes 97 generate lift sufficient, in combination with the lift of baffle means 21, to lift the vehicle and its cargo. Vanes 96 are selectively operated by means of a suitable control unit in control housing 27 to provide lateral movement of the vehicle when airborne. It is a feature of this invention that the character of the maneuvering apparatus described in conjunction with FIGS. 4, 6, and 7 allows the vehicle to be moved laterally in any direction without changing the alignment of the vehicle chassis. The steering mechanism provided by the second preferred embodiment of the present invention also provides convenient braking apparatus for stopping lateral movement of the vehicle through the air.

While the invention has been described above in conjunction with specific apparatus, this has been by way of example and illustration and should not be considered as limiting the scope of the present invention.

What is claimed is:

1. Aerodynamic lift apparatus comprising
   (1) a plurality of annular coaxially aligned baffle means spaced apart from each other along an axis, the baffle means decreasing in diameter progressing along the axis from a first to a last baffle means,
   (2) a perforated circular wing disposed concentric to the axis adjacent the first baffle means,
   (3) rotatable variable lift means disposed concentric to the axis opposite the circular wing from the first baffle means,
   (4) means for moving air radially through the baffle means to generate lift across the baffle means and to induce air flow past the variable lift means through the circular wing, and
   (5) means for rotating the variable lift means about the axis in the stream of induced air flow to generate lift supplemental to the lift across the baffle means.

2. Aerodynamic lift apparatus comprising
   (1) a plurality of circular coaxially aligned baffle means spaced apart from each other along an axis, the baffle means decreasing in diameter progressing along the axis from a first to a last baffle means,
   (2) a perforated circular wing disposed concentric to the axis adjacent the first baffle means,
   (3) rotatable variable lift means disposed concentric to the axis opposite the circular wing from the first baffle means and including a plurality of airfoil elements extending radially from the axis, the airfoil elements being adjustable in pitch relative to the axis,
   (4) means for moving air radially through the baffle means to generate lift across the baffle means and to induce air flow past the variable lift means through the circular wing,
   (5) means for rotating the variable lift means about the axis in the stream of induced air flow to generate lift supplemental to the lift across the baffle means, and
   (6) means for adjusting the pitch of the airfoil elements during rotation of the variable lift means.

3. Apparatus according to claim 2 wherein the variable lift means comprises an adjustable pitch propeller assembly.

4. Apparatus according to claim 2 wherein the variable lift means comprises a concave upwardly dished member having a planar portion adjacent its periphery and a conical portion disposed concentric to the axis adjoining the planar portion, a portion of the plurality of airfoil elements being movably mounted in the conical portion and the remainder of the airfoil elements being movably mounted in the planar portion, each airfoil element being disposed radially of the axis and movable from a first position substantially aligned with the respective portion of the dished member to a selected second position in which said each element is pitched relative to its respective portion of the dished member.

5. Apparatus according to claim 4 wherein the means for adjusting the pitch of the airfoil elements includes means for adjusting the said remainder of airfoil elements simultaneously independently of said portion of airfoil elements.

6. Apparatus according to claim 4 wherein the means for adjusting the pitch of the airfoil elements includes means for adjusting the said portion of the plurality of airfoil elements unsymmetrically about the axis and comprises
   (1) a movable actuator disposed between the circular wing and the variable lift means and having an axis normally aligned with the lifting apparatus axis,
   (2) means for movably mounting the actuator to the circular wing,
   (3) said portion of the plurality of airfoil elements comprising groups of airfoil elements,
   (4) a plurality of actuator follower members engaging the actuator and corresponding in number to the number of groups of airfoil elements,
   (5) means for linking all the elements of one group to a respective actuator follower member,
   (6) means for biasing each follower member into engagement with the actuator, and
   (7) selectively operable means for moving the actuator, to pivot the axis thereof about the lifting apparatus axis.

7. Apparatus according to claim 6 wherein one airfoil element of each group of elements is pivotally linked to the respective actuator follower member, and wherein the means for linking all the elements of one group comprises a rigid link rod spanning the group and means for pivotally connecting each element of the group to the link rod.

8. Aerodynamic lift apparatus comprising
   (1) a plurality of parallelly disposed annular airfoil disks coaxially aligned along a vertical axis, the discs decreasing in diameter progressing upwardly of said plurality,
   (2) a non-annular airfoil disc of less diameter than the uppermost annular disc disposed parallel to and above the plurality of discs coaxially therewith,
   (3) air blower means disposed below the plurality of airfoil disks and having a rotatable shaft coaxial with the vertical axis,
   (4) means for mounting the plurality of discs to the blower mean for discharge of air from the blower means radially from the vertical axis over the annular airfoil discs,
   (5) an apertured circular wing disposed below and parallel to the lowermost annular disk above the air blower means and having a diameter greater than the diameter of the lowermost disk,
      air passing radially of the annular discs inducing a flow of air upwardly through the wing and radially of the vertical axis with the blower means discharge,
   (6) rotary airfoil means disposed concentric to and substantially normal to the vertical axis below the wing and above the air blower means, and
   (7) means for operating the blower means and for rotating the rotary airfoil means.

9. Apparatus according to claim 8 wherein the wing adjacent the axis is turned downwardly in spaced apart relation to the vertical axis to define a tubular duct portion for guiding air from the air blower means to the annular airfoil discs, the shaft of the air blower means extending upwardly through the tubular duct portion to the non-annular airfoil disc in spaced apart relation to the tubular duct portion, first bearing means mounting the shaft to the non-annular disc, second bearing means journalling the shaft within the tubular duct portion, a plurality of radial vanes connected from the second bearing means and the tubular duct portion, means for maintaining the second bearing means in a preselected location axially of the shaft, and means connecting the rotary airfoil means to the shaft for rotation of the rotary airfoil means with the shaft.

10. Apparatus according to claim 9 including means for securing the wing from rotation with the shaft and pressure sealing means between the tubular portion of the wing and the rotary airfoil means.

11. Apparatus according to claim 9 wherein the air blower means is a multi-stage axial flow compressor having a cylindrical housing, the last stage of the compressor comprising a plurality of radial vanes formed in the rotary airfoil means adjacent the means for connecting the rotary airfoil means to the shaft.

12. Apparatus according to claim 11 including bearing means engaged between the compressor housing and the rotary airfoil means for supporting the rotary airfoil means.

13. A heavier-than-air craft comprising
  (1) a frame,
  (2) a plurality of circular coaxially aligned baffle means spaced apart from each other along an axis,
     the baffle means decreasing in diameter progressing along the axis from a first to a last baffle means,
  (3) a perforated circular wing disposed concentric to the axis adjacent the first baffle means,
  (4) rotatable variable lift means disposed concentric to the axis opposite the circular wing from the first baffle means,
  (5) means for moving air radially through the baffle means to generate lift across the baffle means and to induce air flow past the variable lift means through the circular wing,
  (6) means for rotating the variable lift means about the axis in the stream of induced air flow to generate lift supplemental to the lift across the baffle means, and
  (7) means for movably mounting the baffle means, the circular wing, the variable lift means, air moving means, and the means for rotating the variable lift means, as a unit, to the frame.

14. A heavier-than-air craft according to claim 13 wherein the means for movably mounting comprises a yoke member having a stem portion and a pair of arcuate arms extending semicircularly therefrom, a pair of oppositely extending trunnions extending radially from the air moving means, means for rotatably mounting the trunnions to the arms of the yoke member, the frame comprising a hollow tubular portion, and means for rotatably mounting the stem portion of the yoke member in the hollow portion of the frame.

References Cited by the Examiner
UNITED STATES PATENTS 2,468,787   5/49   Sharpe _____ 244—12 X
3,041,009   6/62   Wharton _____ 244—12

FOREIGN PATENTS 1,006,266   4/57   Germany.

FERGUS S. MIDDLETON, *Primary Examiner.*